Feb. 17, 1959 F. L. RIEGER 2,873,536
COMBINED COMPASS, INCLINOMETER AND ACCELEROMETER
Filed March 24, 1955 3 Sheets-Sheet 1
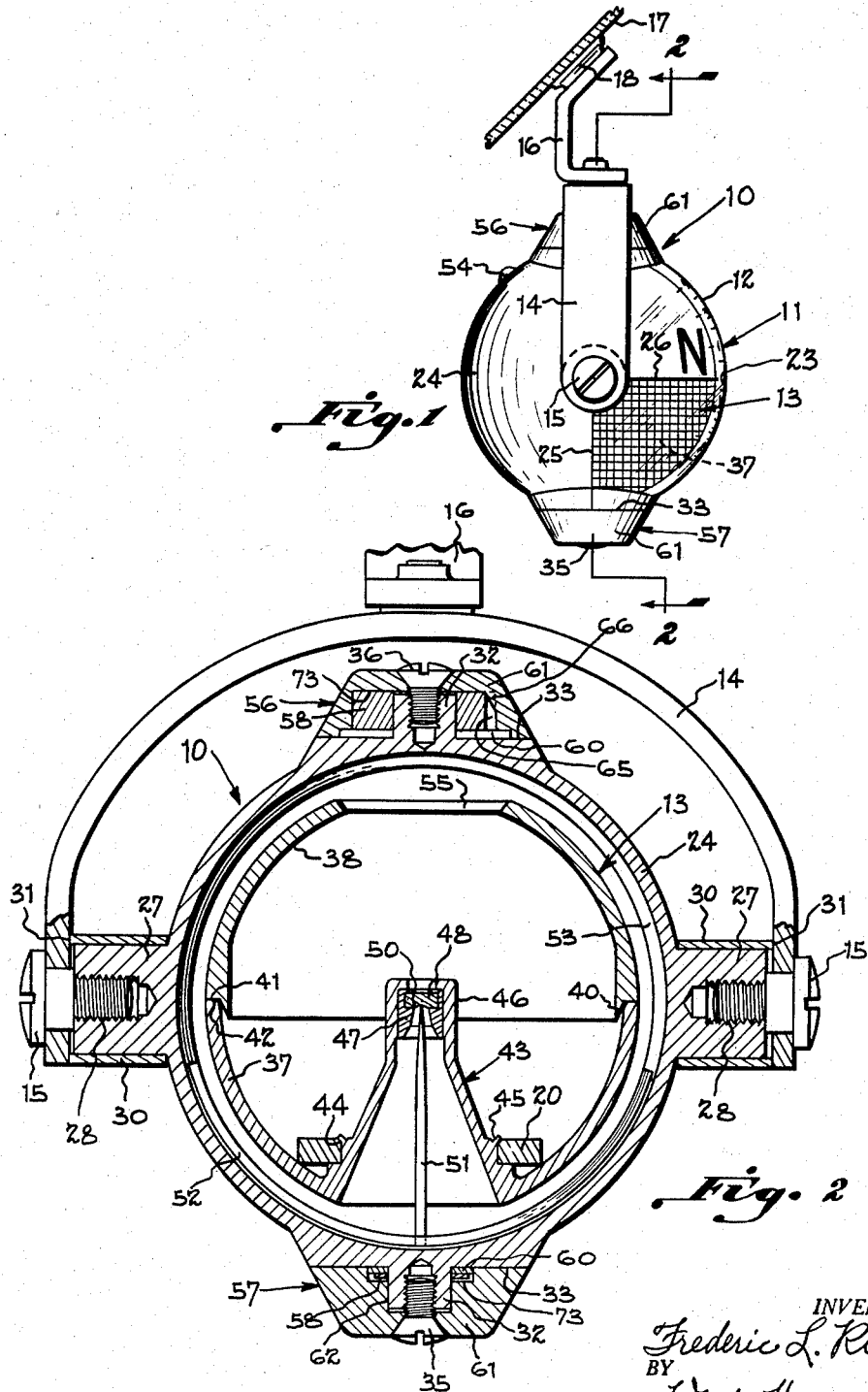
INVENTOR.
Frederic L. Rieger.
BY
Wood, Herron & Evans.
ATTORNEYS.

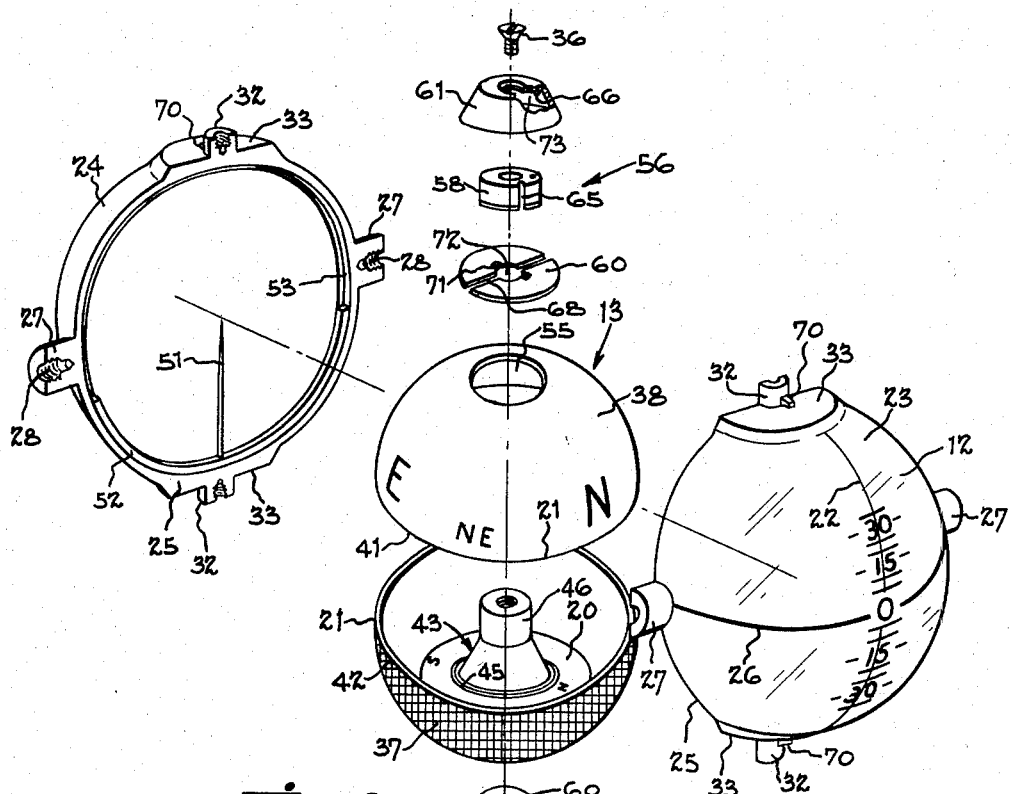
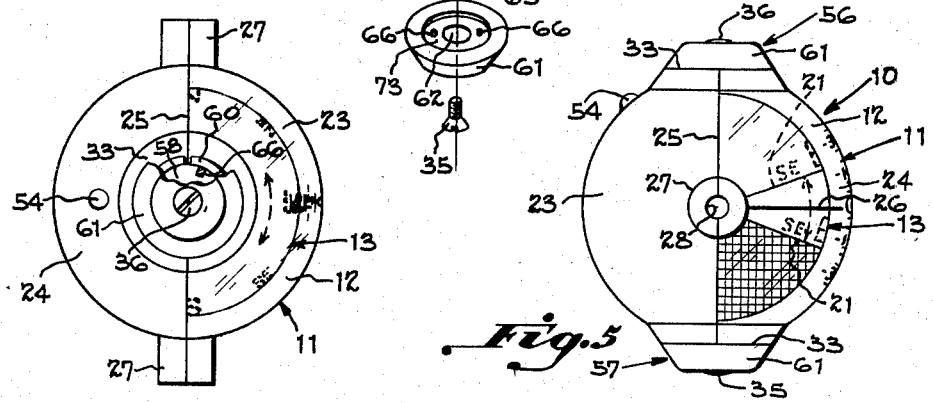

Feb. 17, 1959        F. L. RIEGER        2,873,536
COMBINED COMPASS, INCLINOMETER AND ACCELEROMETER
Filed March 24, 1955        3 Sheets-Sheet 3
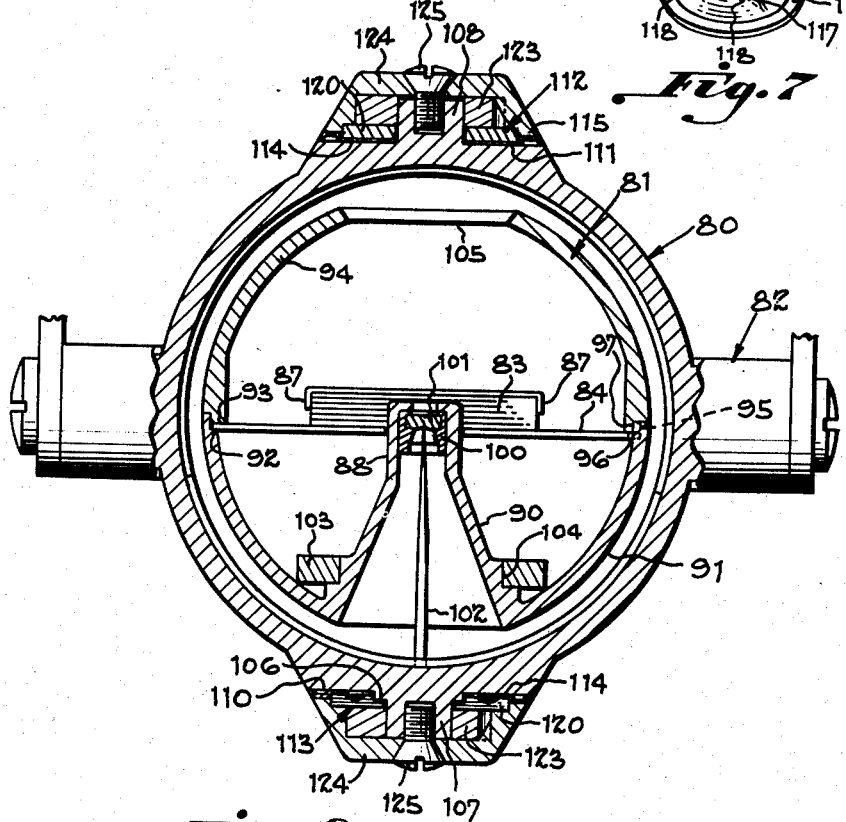
INVENTOR.
Frederic L. Rieger.
BY Wood, Herron & Evans.
ATTORNEYS.

United States Patent Office 2,873,536
Patented Feb. 17, 1959

2,873,536

COMBINED COMPASS, INCLINOMETER AND ACCELEROMETER

Frederic L. Rieger, Dayton, Ohio, assignor to Thermometer Corporation of America, Springfield, Ohio, a corporation of Ohio Application March 24, 1955, Serial No. 496,488

10 Claims. (Cl. 33—225)

The present invention relates to indicating devices for use on small vehicles and is particularly directed to an instrument adapted to function as a magnetic compass, a gravity type inclinometer, and an accelerometer.

The principal object of the present invention is to provide a single device of simple construction effective to indicate to the operator of a vehicle its direction of travel, the degree to which the vehicle is inclined to horizontal, and the relative rate of the vehicle's acceleration and deceleration.

More particularly, an instrument constructed in accordance with the principles of the present invention comprises a spherical housing, at least a portion of which is formed of a transparent material such as a clear plastic. A bracket or similar mounting means is provided for securing the housing to the windshield or other member of the vehicle. An inner sphere concentric with the outer housing is mounted for rotation about a vertical axis within the housing and for limited universal tilting movement in any direction. The inner sphere carries a main magnet for positioning the sphere in accordance with the earth's magnetic field. In addition the sphere houses means constituted either by the magnet or by a separate weight for stabilizing the sphere about a horizontal axis. The inner sphere is provided with appropriate indicia for indicating the cardinal points of a compass and is also provided with a horizontal line. The transparent portion, or window, of the housing is provided with a vertical lubber line, a horizontal reference, or "level" line, and a series of horizontal markings above and below the level line. These markings cooperate with the indicia imprinted on the inner sphere to indicate direction, acceleration and inclination.

It is well recognized that a compass mounted in a vehicle such as an automobile tends to give erroneous indications of direction due to the effect of the local magnetic field caused by steel and other magnetic material and electrical equipment carried by the vehicle. The present invention contemplates the provision of simple and yet extremely effective compensating means for neutralizing the effect of the local magnetic field. Specifically, the compensating means include upper and lower compensating assemblies disposed above and below the main magnet.

Each assembly comprises a slotted shield formed of soft iron or other magnetically permeable material. A small compensating magnet is disposed adjacent to the surface of the shield, remote from the main magnet; this magnet is mounted for rotation about the same axis as the axis of rotation of the main magnet. Each compensating assembly also includes a cap which performs the triple function of rotating the small compensating magnet enclosing the compensating magnet and shield, and holding the shield and small magnet in their assembled position.

As explained in detail below, each compensating assembly is effective to neutralize one of the two components of the local horizontal magnetic field. That is, the local horizontal magnetic field can be considered as having two mutually perpendicular components. The slot in the shield of the upper compensating assembly and the corresponding slot in the lower shield are positioned at right angles to one another so that each compensating assembly functions to neutralize only the particular component of the field perpendicular to the slot.

One of the principal advantages of the present invention is that although the instrument is of extremely simple construction, it provides an accurate indication of three different quantities; namely, direction, inclination and acceleration. The same index lines which give an indication of inclination also provide an indication of the magnitude of acceleration to give a comparison of fast starts and stops. Moreover, the indications of inclination and acceleration can be observed no matter what direction the vehicle is headed.

An additional advantage of the present invention is that the instrument is extremely simple to manufacture. As explained in greater detail below, the inner and outer shells are formed of simple plastic mouldings which are joined together by cementing. A minimum number of parts is required, since the same two members used to give an indication of direction also indicate inclination and acceleration. In a preferred embodiment the main magnet, which is positioned adjacent to the lower portion of the inner sphere, performs a triple function since it not only positions the sphere about a vertical axis in accordance with the earth's magnetic field, but it also stabilizes the sphere about a horizontal axis so that the device functions as a gravity type inclinometer. Moreover, the magnet provides an unbalanced inertia condition between the upper and lower portions of the inner sphere causing that element to tilt in response to an acceleration or deceleration, the amount of tilt providing an indication of the rate of acceleration or deceleration.

In a modified embodiment, the magnet functions only to orient the inner sphere about a vertical axis and a separate weight is disposed adjacent to the lower portion of the sphere to stabilize the sphere about a horizontal axis. While this modification requires the use of an additional element as explained in detail below, it is highly advantageous in that it simplifies the construction by facilitating the use of identical compensating assemblies at the upper and lower ends of the outer housing. It is also advantageous since it facilitates the use of less expensive bar magnets as the main magnetic elements of the compass.

An additional advantage of the present construction is that the compensating means are of extremely simple construction requiring a minimum of parts and facilitating ease of assembly. A still further advantage of the compensating means is that they provide a very smooth gradual compensation for the errors in position of the inner sphere; consequently even an untrained individual can accurately compensate his compass in an extremely short time.

These and other advantages of the present invention will be more readily apparent from a consideration of the following detailed description of the drawings illustrating a preferred embodiment of the invention.

In the drawings:

Figure 1 is a side elevational view of an instrument constructed in accordance with this invention.

Figure 2 is a cross sectional view taken along line 2—2 of Figure 1.

Figure 3 is an exploded view showing the component elements of the instrument.

Figure 4 is a top plan view of the device.

Figure 5 is a side elevation view of the device with the mounting bracket removed to show how longitudinal inclination and acceleration are measured.

Figure 6 is a perspective view of the lower half of a modified form of inner sphere.

Figure 7 is a perspective view of a pan and compensating shield for use in the modified instrument shown in Fig. 8.

Figure 8 is a vertical cross sectional view, similar to Fig. 2 showing a modified instrument.

As best shown in Figures 1–3, one preferred form of instrument 10 constructed in accordance with the present invention comprises a generally spheroidal housing 11 having a transparent window 12 and enclosing a relatively movable inner sphere 13. Means are provided for rigidly mounting the housing in any desired position on an automobile, truck, tractor, airplane, or boat. In the embodiment shown, these means comprise a mounting bracket 14 which is adjustably secured to the housing by means of bolts 15. The bracket carries an arm 16 which is mounted on windshield 17 or on another part of a vehicle in any suitable manner such as by means of a suction cup 18 or by means of bolts or screws (not shown).

Inner sphere 13 carries a main magnet 20 adapted to position the sphere in accordance with the earth's terrestrial magnetic field; and in addition the sphere is provided with suitable indicia positioned with respect to the poles of this magnet for indicating, in conjunction with a lubber line 22, the direction in which the vehicle is headed. The inner sphere is also provided with a horizontal line 21 disposed for registry with one of a plurality of horizontal reference marks provided in the transparent window portion 12 of the outer sphere. As explained in greater detail below, the relative position of horizontal line 21 and the horizontal reference markings on the outer sphere yield an indication of the longitudinal and transverse inclination of the vehicle, and also provides means for indicating its acceleration.

More particularly, outer housing 11 is formed of two generally semi-spherical sections 23 and 24. In the preferred embodiment, these sections are joined together in any suitable manner such as by applying cement between their abutting edges 25—25. These segments can be formed of any suitable material such as glass or non-magnetic metal, however, I have found that a plastic material such as an acrylic or phenolic resin is preferable because of its light weight, durability, and the ease with which it can be fabricated. Preferably, rear section 24 is opaque, while section 23 is transparent providing a window portion 12 for viewing the markings provided on inner hemisphere 13.

Transparent section 12 is provided with a plurality of markings, or reference lines, adapted for cooperation with the indicia on the inner sphere. The first of these markings is lubber line 22 which is disposed in a plane containing the principal axs of rotation of the inner sphere 13 and extending parallel to the line of travel of the vehicle in which the compass is mounted. The second marking provided is a principal horizontal reference, or level line 26. In addition to this principal line, the window includes a plurality of auxiliary markings extending parallel to line 26. These markings are disposed above and below the principal horizontal line and are adapted for cooperation with the horizontal line on the inner cylinder for indicating the inclination or acceleration of the vehicle.

Each of the sections 23 and 24 is also provided with a pair of projecting hubs 27 which are aligned when the two sections are assembled. Each hub is preferably tapped as at 28 for receiving bolts 15 effective to hold mounting bracket 14 in engagement with the hubs. In the preferred embodiment, ferrule members 30 are placed over the hubs to reinforce them and to provide a suitable bearing surface 31 for the inner surface of the mounting bracket. It will be understood that mounting bracket 14, ferrules 30, and bolts 15 are preferably formed of a non-magnetic material such as aluminum or brass.

Each housing section is also provided with a pair of diametrically opposed posts 32 extending outwardly from flat shoulders 33. In the preferred embodiment, as best shown in Figures 2 and 3, these posts are aligned with the axis of rotation of the inner sphere 13. As explained in detail below, the posts function as support elements of the magnets and shields of the upper and lower compensating devices and also are threaded to receive set screws 35 and 36 for locking the compensating magnets in any desired position.

Inner sphere 13 also comprises two generally semi-spherical sections 37 and 38, preferably formed of a plastic material similar to that used to form the outer housing 11. These members are preferably joined along a horizontal line by press fitting the inner tapered flange 40 of the upper section 38 into the interior of the lower section 37 and applying a suitable cement to the adjacent edges 41 and 42 of the sections. Lower sections 37 is preferably formed of a different colored material from the upper section so that the line along which the two are joined forms the horizontal reference line 21 mentioned previously for indicating the inclination and acceleration of the vehicle.

The lower section 37 is provided with a generally conical inwardly extending support member 43 which carries main magnet 20. This magnet can be of any suitable type having a permanent north and south pole; as shown, one preferred form a magnet is configurated to form a circular ring having diametrically opposed north and south poles as shown in Figure 3. Magnet 20 is fitted in an annular slot 44 formed in the lower end of support member 43 and is held in place adjacent to the bottom sphere 13 by means of a circular lip 45 which is bent under heat and pressure to a position in which it overlies the upper edge of the magnet.

Conical support member 43 includes a neck 46 which extends to the geometrical center of the inner sphere 13. A cylindrical brass plug or jewel mount 47 is press fitted into this neck and carries a pivot jewel 48 having a recess 50 adapted to engage the end of pivot needle 51 by means of which the inner cylinder is supported within the outer housing. Pivot needle 51 is press fitted or otherwise secured to a brass ring segment 52 which is in turn mounted in a groove 53 formed in the front outer housing segment 23. The ring is positioned so that the needle extends vertically, parallel to the lubber line, and terminates at substantially the geometric center of the inner sphere.

A fluid such as light oil, kerosene or similar fluid is introduced into the outer housing through a plug opening 54 which is later sealed in any suitable manner. This damping fluid completely fills the outer casing and inner sphere which it enters through opening 55, except for a small air space which is left at the top of the housing to provide for fluid expansion due to temperature rise. The function of this fluid is to damp the movement of the inner sphere so that its position will not fluctuate excessively during changes of position of the vehicle.

In addition to the elements previously described, the instrument is provided with compensating means for substantially eliminating semi-circular deviation due to the local magnetic field produced by magnetic masses and electrical equipment present in the vehicle. It has previously been recognized that the effect of the horizontal component of such a local magnetic field can be eliminated by providing an opposing parallel field of the same strength. The horizontal component of the local magnetic field is constituted by the sum of an axial component and a transverse component; that is a first component which runs fore and aft the vehicle and a second component which extends at right angles to the first.

In the embodiment shown, the compensating means for neutralizing this local field comprise upper and lower compensating assemblies 56 and 57. The upper compensating assembly 56 is adapted to provide correction for the transverse component for the local magnetic field; while the lower compensating assembly 57 is adapted to provide correction for the axial component of the local magnetic field.

Each compensating assembly includes a small compensating permanent magnet 58 mounted for rotation about the axis of rotation of the inner sphere and a shield 60 formed of magnetically permeable material disposed intermediate the small compensating magnet and the main magnet carried by the inner sphere. Each compensating assembly also includes a cap 61 for enclosing the compensating magnet and shield, and for rotating the compensating magnet to any desired position. Non-magnetic screw 35 fits through an opening 62 in the cap and threadably engages post 32 for clamping the cap and compensating magnet in any desired position.

As shown, each compensating magnet is in the form of a flat cylinder having diametrically opposite poles 63, a central opening 64, and notches 65. Opening 64 is adapted to receive post 32 so that the axis of rotation of the magnet is fixed in coincidence with the axis of rotation of main magnet 20. Notches 65 are adapted to cooperate with lugs 66 formed on the interior of hollow cap 61 so that rotation of the cap is effective to cause rotation of its associated compensating magnet. Magnetic shield 60 is constituted by two substantially semicircular discs of magnetically permeable material such as soft iron.

As best shown in Figure 3, the adjacent edges of the shield members are spaced from one another to define a slot 68. The slot 68 formed in the upper compensating assembly 56 is disposed at right angles to the slot formed in the shield of the lower compensating assembly 57. Upper slot 68 is oriented by means of lugs 70 formed on upper shoulders 33 of housing members 23 and 24. The shield members of the upper compensating assembly are provided with small radial notches 71 disposed at the center of each shield. When the instrument is assembled, the upper shields are placed against the shoulders 33 with the central opening 72 of the shield members receiving center post 32 and notches 71 receiving lugs 70. Thus the slot between the adjacent shield members extends in a transverse plane parallel to the edge of the semi-spherical sections 23 and 24.

The lugs 70 formed adjacent to the lower shoulders 33 extend parallel to the lugs on the upper shoulders. However, the lower shield members are rotated 90° relative to the upper shields and the lower lug members are disposed between the adjacent edges of the lower shield members when the shield members are placed against the lower shoulders surrounding the lower post. The slot in the lower shield members thus extends in a longitudinal, or fore and aft plane. After the magnetic shields have been positioned, the compensating magnets are placed over the posts, the inner surface of the magnets residing in engagement with the shields. The caps are then placed over the magnets and function to hold the magnets against their respective shields. The inner surface 73 of each cap also engages the periphery of the associated shield members to prevent their displacement.

Since the lower compensating means is considerably closer to the main magnet than the upper compensating means, its relative effect on the main magnet is correspondingly greater. Therefore, in order to provide balanced compensation for both components of the local horizontal field, the upper magnet and upper compensating shields have a thickness which is several times as great as that of the lower compensating magnet and shield.

When installing an instrument 10 in a vehicle such as an automobile, the vehicle is placed on level ground. Next the adjusting bracket is mounted upon a member of the car so that the plane containing the lubber line and pivot pin 51 defining the axis of rotation of the inner cylinder is parallel to the fore and aft axis of the automobile. Then by loosening screws 15, the outer housing is adjusted until level line 26 is in registry with horizontal line 21 formed on inner sphere 13.

The car is then headed due north and lower screw 35 is loosened sufficiently to permit the lower cap to be turned. If the "N" indicia on the inner sphere is not in alignment with the lubber line, the lower cap and compensating magnet are turned sufficiently to bring the "N" into registry with this line.

It will be apparent that turning magnet 58 causes the north and south poles of that magnet to gradually change from a magnetically shorted condition to a magnetically unshorted condition or vice versa. That is when the north and south poles of magnet 58 are disposed in registry with the slot between shields 60, the magnetic circuit is completed through the highly permeable shields and a minimum corrective effect is exerted upon the main magnet. However, when magnet 58 is turned to a position in which the poles are disposed centrally of the shield plates, the flux circuit is competed through the surrounding air and a maximum effect is exerted upon the main magnet. As the compensating magnet is shifted from one of these extreme positions to the other, its effect upon the main magnet gradually changes from maximum to minimum or vice versa, so that any desired degree of correction can be obtained. Next, the car is headed east and the upper screw 36 is loosened to permit the upper cap to be rotated. If the "E" marking on the inner sphere is not in registry with the lubber line, the upper cap and magnet are turned to bring it into registry with the line. Then the car is headed south and if the "S" marking on sphere 13 is not disposed beneath the lubber line, the lower cap and compensating magnet are rotated to remove one-half of the error. To make the next compensation, the car is headed west and the upper cap and compensating magnet are rotated to remove one-half of any error appearing. Any error remaining after these compensations can be removed by successively following the above described procedure at each of the cardinal compass four positions. After the compass has been properly levelled and compensated, set screws 35 and 36, and mounting screws 15 are tightened to lock the housing and compensating magnets in place.

In use, an operator of a vehicle can determine the direction in which he is headed by noting the indicia aligned with the lubber line in the customary manner. However, in addition, the operator can determine the fore and aft inclination of his vehicle by noting the position of line 21 formed on the inner sphere relative to the horizontal markings formed on the housing. The weight of main magnet 20 disposed adjacent to the lower portion of inner sphere 13 functions to hold that sphere in the same vertical position, while the outer housing moves about the sphere with the vehicle. The exact fore and aft inclination of the vehicle at zero acceleration is determined from the particular horizontal marking with which this line is in registry. These markings indicate in degrees the angle to which the vehicle is inclined. An indication of the transverse inclination of the vehicle can also be obtained from the relative canting of inner line 21 and level line 26.

Also an indication of the rate of acceleration or deceleration can be obtained at substantially constant tilt by noting how far the horizontal line, formed on the inner sphere, rises or falls relative to the level line on the outer sphere when the vehicle is started or stopped.

The relative movement of the inner sphere and housing in this case is due to the fact that the main magnet 20 causes the lower portion of the sphere to have a higher inertia than the upper portion so that when the inner sphere is accelerated it tends to tilt upwardly and when it is decelerated it tends to tilt downwardly.

One of the principal advantages of this construction is that this auxiliary information about inclination, acceleration and deceleration can readily be obtained no matter what direction the vehicle is headed. Moreover, while the damping fluid is effective to prevent excessive fluctations of the inner sphere so that accurate readings can be obtained shortly after a change of position; nevertheless the spherical configuration of member 13 and the outer housing prevents the fluid from exerting an excessive resistance force to relative movements of the two members in any direction.

A modified form of device is shown in Figures 6, 7, and 8. However, the basic construction of this unit is substantially the same as that of the preferred embodiment. Specifically, it comprises a spherical outer housing 80 having a transparent window, a lubber line, a level line, and a plurality of horizontal markings as described in detail in connection with the disclosure of the first embodiment. Also, as in the first embodiment housing 80 encloses a relatively movable inner sphere 81 and is provided with bracket supporting means 82 for mounting the housing on an automobile, truck, or the like. The inner sphere carries main magnets 83 which in this embodiment are mounted on an elongated plate 84. The sides of the plate are bent up as at 85 and 86, and tabs 87 are provided to form clips for supporting the elongated magnets 83. Magnets 83 are conventional bar magnets having a north pole at one end and a south pole at the other. In the embodiment shown these magnets are mounted parallel to one another, the north pole of each magnet facing the same direction.

Plate 84 is provided with a central opening adapted to fit over the neck 88 of conical support member 90 formed in the lower segment 91 of inner sphere 81. As best shown in Fig. 8 the ends of plate 84 engage a shoulder 92 found on the lower hemisphere and are clamped between that shoulder and a depending rim 93 provided on the upper hemisphere 94. The direction indicating indicia provided on the upper sphere and the main magnets are properly aligned by means of a lug 95 formed on hemisphere 91, adapted for engagement with notches 96 and 97 respectively formed in the plate and upper hemispher.

In the modified embodiment, the lower section is provided with a cylindrical bearing block, or jewel mount 100 which is press fitted in neck 88 and carries a pivot jewel 101 adapted for engagement with pivot needle 102. The inner sphere also carries an annular weight 103 formed of a non magnetic material, disposed in an annular slot 104 formed at the lower end of conical support 90. As in the first embodiment after the magnets and weight have been inserted in place the upper and lower hemisphere are joined together by applying a suitable cement to the two sections. Also as in the first embodiment, upper hemisphere 94 is provided with an opening 105 for admitting damping fluid to the interior of the sphere.

The outer housing of this embodiment is identical with the outer housing of the first embodiment except that in the modified embodiment shown in Fig. 8, lugs formed on lower post 107 are disposed at right angles to the lugs (not shown) formed on upper post 108. These posts together with flat shoulders 110 and 111 support the upper and lower compensating assemblies as in the preferred embodiment. As in that embodiment, two compensating assemblies are provided for substantially eliminating semi-circular deviation due to the local magnetic field. The upper compensating assembly 112 is adapted to compensate for the transverse component of the local field while lower compensating assembly 113 is adapted to compensate for the axial component of local magnetic field.

As shown in Fig. 7 and 8 the two compensating assemblies are identical with one another, which greatly facilitates production of the compass. This is made possible by positioning the main magnets at a point half way between the two compensating assemblies. Since the compensating assemblies are identical only the lower one will be described. This compensating assembly includes a leveling pan 114, which is preferably constituted by a non magnetic metal stamping and is of a circular configuration including a peripheral rim 115. The pan is also configurated to form a central opening 116, two diametrically opposed dividing ribs 117 and notches 118 aligned with the divider ribs and extending radially from central opening 116. Pan 114 fits over post 107 and is oriented about the post by the engagement of lugs 106 with notches 118. Magnetically permeable shield plates 120—120 fit in the annular dished-out portion 121 of the pan. The width of slot 122 between the shield plates is accurately defined by the width of separator ribs 117.

The compensating assembly also includes an annular magnet 123 which fits over post 108 so that one face of the magnet abuts the shield plates. The assembly is completed by means of a rotatable cap 124 which fits over the magnet, the compensating shields, and pan, and is held in place by set screws 125 threadably engaging post 107 and 108. It will be appreciated that the slot 122 between the shields of the upper compensating assembly is disposed at right angles to the slot in the shields of the lower compensating assembly. The operation of these compensating assemblies is identical with that of the first embodiment described above.

In addition to the fact that the compensating assemblies are identical, the construction of the second embodiment is advantageous for several reasons. In the first place, the use of leveling pans 114 facilitates the manufacture of the devices, since the shields can be snapped into place within the pan and then the pan placed over the post. The shields are thus readily held in position while the remaining elements of the compensating assembly are brought into place. The second advantage provided by the use of leveling pans is that the width of the slot is accurately controlled so that the compensating assembly functions most effectively. Furthermore, when shield plates are placed directly over the plastic housing as in the first embodiment, it has been found difficult at times to obtain smooth, continuous compensation. This difficulty is due to slight inaccuracies in the dimensions of the molded housing members, which not only causes the shield spacing to be irregular but also causes the shields to cant with respect to one another. This results in improper contact between the magnet and shields, and improper magnetic short circuiting when the magnet is rotated. The use of levelling pans insures that the compensating magnet will firmly engage the shield plates in any position so that accurate compensation is always provided.

Having described my invention, I claim:

1. A combined compass, inclinometer and accelerometer comprising a housing having a transparent window portion, a movable member mounted within said housing for rotation about a vertical axis and for limited universal tilting movement, a main magnetic element mounted on the inner member and disposed adjacent to the lower portion of said member for positioning the member in accordance with the earth's magnetic field, said inner member having direction indicating indicia and a horizontal line formed thereon, the transparent portion of said housing being provided with a vertical lubber line and a level line for respectively cooperating with said direction indicating indicia and the horizontal line of said inner member, and means for compensating said main magnet for semi-circular deviation, said means comprising compensating assemblies mounted upon said housing above and below said main magnet in alignment with the axis of rotation of said inner member, each of said compensating assemblies comprising a compensating magnet mounted so that its poles pivot about the axis of rotation of the main magnet, and a shield formed of magnetically permeable material disposed intermediate the compensating magnet and main magnet, said shield having a diametral slot, the slot of the upper compensating assembly shield being disposed at an angle of 90° to the slot of the lower compensating assembly shield.

2. A compass comprising a housing including a portion which is transparent, a movable member mounted within said housing for rotation about a vertical axis, a main magnet element mounted on the inner member for positioning the member in accordance with the earth's magnetic field, said inner member having direction indicating indicia formed thereon, cooperating with said transparent portion of said housing to provide a directional indication, and means for compensating said main magnet for semi-circular deviation, said means comprising compensating assemblies supported to fixed relation to said housing above and below said main magnet in alignment with the axis of rotation of said inner member, each of said compensating assemblies comprising a compensating magnet mounted so that its poles pivot about the axis of rotation of the main magnet, and a shield formed of magnetically permeable material disposed intermediate the compensating magnet and main magnet, said shield having a diametral slot, the slot of the upper compensating assembly shield being disposed at an angle of 90° to the slot of the lower compensating assembly shield.

3. A combined compass, inclinometer and accelerometer comprising a housing having a transparent window portion, a movable member mounted within said housing for rotation about a vertical axis and for limited universal tilting movement, a main magnetic element mounted on the inner member and disposed adjacent to the lower portion of said member for positioning the member in accordance with the earth's magnetic field, said inner member having direction indicating indicia and a horizontal line formed thereon, the transparent portion of said housing being provided with a vertical lubber line and a level line for respectively cooperating with said direction indicating indicia and the horizontal line of said inner member, and means for compensating said main magnet for semi-circular deviation, said means comprising compensating assemblies mounted on said housing above and below said main magnet in alignment with the axis of rotation of said inner member, each of said compensating assemblies comprising a post extending outwardly from said housing, a circular compensating magnet including a central opening for receiving said post, a shield formed of magnetically permeable material surrounding said post intermediate the compensating magnet and main magnet, a cap disposed over said compensating magnet and said shield, said cap being rotatably mounted and being effective to turn said magnet, and means for selectively locking said cap against movement, the slot of the upper compensating shield being disposed at an angle of 90° to the slot of the lower compensating assembly shield.

4. In a compass, a fluid tight housing including a portion which is transparent, a movable member mounted within said housing for rotation about a vertical axis and for limited universal tilting movement about a point on said vertical axis, a main magnetic element mounted on the inner member and disposed vertically below said point of said member for positioning the member in accordance with the earth's magnetic field, said inner member having direction indicating indicia thereon for cooperation with the transparent portion of said housing for indicating direction, and means for compensating said main magnet for semi-circular deviation comprising separate permanent magnets one mounted above said housing and one mounted below said housing each adjustably mounted for pivotal movement about said vertical axis, the strength of each of said magnets being inversely proportional to its distance from the main magnetic element.

5. A compass, comprising a housing, a main magnetic element mounted for movement about a vertical axis to assume a position in accordance with the earth's magnetic field, and means for compensating said main magnet for semi-circular deviation, said means comprising compensating assemblies mounted on said housing above and below said main magnet in alignment with the axis of rotation of said inner member, each of said compensating assemblies comprising a post extending outwardly from said housing, a compensating magnet including a portion extending on opposite sides of said post, a leveling pan formed of non magnetic material, said leveling pan surrounding said post in engagement with said housing, said leveling pan being of circular configuration and including a peripheral rim, said leveling pan being provided with two diametrically opposed radially extending ribs, a shield formed of magnetically permeable material surrounding said post intermediate the compensating magnet and main magnet, said shield being formed of two semicircular sections, said sections being disposed in engagement with said leveling pan, the adjacent ends of said shield sections being separated by said ribs, to define slots in said shield, a cap disposed over said compensating magnet and said shield, said cap being rotatably mounted and being effective to turn said magnet, and means for selectively locking said cap against movement, the slot of the upper compensating shield being disposed at an angle of 90 degrees to the slot of the lower compensating assembly shield.

6. The compass as defined in claim 4 wherein said compensating means further includes a shield of magnetizable material having a non-magnetic gap mounted between each permanent magnet and the main magnetic element, and means mounting said shields with said gaps oriented perpendicularly to each other.

7. In a compass having a main magnet journaled for movement about a vertical axis, means for compensating said main magnet for semi-circular deviation comprising compensating assemblies supported in fixed relation to and on opposite sides of said main magnet, each of said compensating assemblies comprising a compensating magnet so mounted that its poles pivot about an axis parallel to the axis of rotation of the main magnet, and a shield formed of magnetically permeable material disposed intermediate the compensating magnet and the main magnet, each shield having a non-magnetic slot, the slot of one compensating assembly shield being disposed at an angle of 90 degrees relative to the slot of the other compensating shield.

8. In a compass, a housing of non-magnetic material, a main magnet journalled for movement about a vertical axis in said housing, means for compensating said main magnet for semicircular deviation comprising compensating assemblies supported in fixed relation to said housing at positions above and below the main magnet, each of said compensating assemblies comprising a compensating magnet mounted so that its poles pivot about an axis parallel to the axis of rotation of the main magnet, a non-magnetic member rigidly positioned on said housing, a shield of magnetically permeable material supported on said non-magnetic member having a non-magnetic gap which in the upper compensating assembly is disposed at an angle of 90 degrees relative to disposition of the non-magnetic gap in the lower compensating assembly, and means mounting said compensating magnets on the sides of said shields remote from said main magnet.

9. A compass including a housing having top and bottom walls formed of non-magnetic material and provided with an exterior post extending from a wall of said housing, a main magnet mounted for pivotal movement about a vertical axis in said housing to assume a position in accordance with the earth's magnetic field, and compensating means including a non-magnetic pan having an aperture adapted to fit over said post and secured against pivotal movement on said housing, a positioning ridge on said pan, a shield of magnetically permeable material having a non-magnetic gap and cooperating with said ridge to be non-rotatably mounted on said pan, a cap mounted on said post for pivotal movement and carrying a compensating magnet on the side of said shield remote from said main magnet, and means for selectively locking said cap against movement.

10. A compass including a housing having top and bottom walls formed on non-magnetic material and provided with exterior posts axially aligned and extending outwardly from said walls, a main magnet mounted for pivotal movement about the axis of said posts, and a compensating means mounted on each post including a non-magnetic pan having an aperture adapted to fit over said post and secured against pivotal movement on said housing, a positioning ridge on said pan, a shield of magnetically permeable material having a non-magnetic gap and cooperating with said ridge to be non-rotatably mounted on said pan, said non-magnetic gaps lying in parallel planes perpendicular to said axis and one of said gaps being disposed at an angle of 90 degrees relative to said other gap, a cap mounted on each post for pivotal movement and carrying a compensating magnet on the side of said shield remote from said main magnet, and means for selectively locking said cap against movement.

References Cited in the file of this patent

UNITED STATES PATENTS

| | | |
|---|---|---|
| 1,474,394 | Warburg | Nov. 20, 1923 |
| 2,192,148 | Otto | Feb. 27, 1940 |
| 2,254,610 | Kunze et al. | Sept. 2, 1941 |
| 2,260,396 | Otto | Oct. 28, 1941 |
| 2,294,990 | Kollsman | Sept. 8, 1942 |
| 2,310,041 | Sherill | Feb. 2, 1943 |
| 2,513,044 | Page | June 27, 1950 |

FOREIGN PATENTS

| | | |
|---|---|---|
| 10,053 | Great Britain | July 10, 1888 |